United States Patent
Iliev et al.

(10) Patent No.: US 12,287,430 B2
(45) Date of Patent: Apr. 29, 2025

(54) FREQUENCY INFORMATION RAPID EXTRACTION FOR RANGING APPLICATIONS

(71) Applicant: AQRONOS, INC., Broomfield, CO (US)

(72) Inventors: Marin Iliev, Broomfield, CO (US); Brenden Villars, Broomfield, CO (US)

(73) Assignee: AQRONOS, INC., Broomfield, CO (US)

( * ) Notice: Subject to any disclaimer, the term of this patent is extended or adjusted under 35 U.S.C. 154(b) by 37 days.

(21) Appl. No.: 18/325,171

(22) Filed: May 30, 2023

(65) Prior Publication Data

US 2023/0296737 A1 Sep. 21, 2023

Related U.S. Application Data

(63) Continuation of application No. 17/222,218, filed on Apr. 5, 2021, now Pat. No. 11,662,437.

(Continued)

(51) Int. Cl.
*G01C 3/08* (2006.01)
*G01S 7/481* (2006.01)
(Continued)

(52) U.S. Cl.
CPC ........... *G01S 7/4817* (2013.01); *G01S 7/4911* (2013.01); *G01S 7/4916* (2013.01); *G01S 17/34* (2020.01); *G01S 17/58* (2013.01)

(58) Field of Classification Search
CPC .... G01S 7/4817; G01S 7/4911; G01S 7/4916; G01S 17/34; G01S 17/58
See application file for complete search history.

(56) References Cited

U.S. PATENT DOCUMENTS 10,838,061 B1 * 11/2020 Crouch .................. G01S 17/34
2011/0285980 A1 11/2011 Newbury et al.
(Continued)

FOREIGN PATENT DOCUMENTS

CN 110632597 A 12/2019
CN 110780310 A 2/2020
(Continued)

OTHER PUBLICATIONS

Hansch, "Nobel Lecture: Passion for Precision", Reviews of Modern Physics, vol. 78, No. 4 (2006), 1297, Nov. 17, 2006, Retrieved on Nov. 29, 2021 from <https://journals.aps.org/rmp/abstract/10.1103/RevModPhys.78.1297>, 13 pages.
(Continued)

*Primary Examiner* — Mark Hellner
(74) *Attorney, Agent, or Firm* — Sheppard, Mullin, Richter & Hampton LLP; Xin Xie

(57) ABSTRACT

A frequency modulated continuous wave LiDAR system is disclosed that may be scalable and integrated in compact and demanding environments. The improved system of the present disclosure includes: an electro-optic modulator configured to modulate a laser generated by a laser source; a balanced photo detector configured to process an interference signal of a local copy of the laser coupled with a signal of the laser returned from a target and output a beatnote signal; a modulation source with two outputs, and a Frequency Information Rapid Extraction for Ranging Applications ("FIRE-RA") system to receive the interference signal from the balanced photo detector, process the interference signal with a signal from one of the two outputs of the modulation source for the balanced photo detector, and output distance and speed data for the target according to the processed interference signal.

11 Claims, 5 Drawing Sheets

Related U.S. Application Data

(60) Provisional application No. 63/005,011, filed on Apr. 3, 2020.

(51) Int. Cl.
*G01S 7/4911* (2020.01)
*G01S 7/4912* (2020.01)
*G01S 17/34* (2020.01)
*G01S 17/58* (2006.01)

(56) References Cited

U.S. PATENT DOCUMENTS

| 2012/0033197 | A1 | 2/2012 | Minegishi et al. |
| 2014/0369699 | A1 | 12/2014 | Strandjord et al. |
| 2015/0104193 | A1 | 4/2015 | Pierrottet et al. |
| 2017/0146335 | A1 | 5/2017 | Martinez et al. |
| 2017/0343652 | A1 | 11/2017 | de Mersseman et al. |
| 2019/0339359 | A1 | 11/2019 | Wang et al. |
| 2020/0309529 | A1 | 10/2020 | Lambert et al. |
| 2020/0309952 | A1 | 10/2020 | Imaki et al. |
| 2021/0026018 | A1* | 1/2021 | Kern ............ G01S 17/34 |
| 2021/0181321 | A1 | 6/2021 | Huang et al. |

FOREIGN PATENT DOCUMENTS

| JP | H08304541 A | 11/1996 |
| JP | 2010203884 | 9/2010 |
| JP | 2021515212 A | 6/2021 |
| WO | 2017210000 A1 | 12/2017 |
| WO | 2019090131 A1 | 5/2019 |
| WO | 2019130472 A1 | 7/2019 |
| WO | WO-2019234034 A1 * | 12/2019 ......... B60W 60/001 |
| WO | WO 2021011472 A1 * | 1/2021 ............ G01S 17/06 |

OTHER PUBLICATIONS

International Search Report and Written Opinion for PCT/US2021/025752 dated Jan. 31, 2022, 7 pages.

* cited by examiner

FREQUENCY INFORMATION RAPID EXTRACTION FOR RANGING APPLICATIONS

CROSS-REFERENCE TO RELATED APPLICATIONS

The present disclosure is a continuation of U.S. patent application Ser. No. 17/222,218, filed Apr. 5, 2021, to be issued as U.S. Pat. No. 11,662,437, which is based on and claims priority to and benefit of U.S. Provisional Patent Application No. 63/005,011, filed with the United States Patent and Trademark Office on Apr. 3, 2020. The entire content of the above-identified applications is incorporated herein by reference.

TECHNICAL FIELD

Embodiments of the present disclosure generally relate to the field of Light Detection And Ranging ("LiDAR"), and more specifically to Frequency Modulated Continuous Wave ("FMCW") LiDAR systems and methods.

BACKGROUND

LiDAR is a remote sensing method using laser light to measure distance to an object. A flash or scanning LiDAR provides a three-dimensional point cloud of the surroundings. Previous and current LiDAR navigation systems (e.g., navigation systems on vehicles) relied on a first-generation pulsed technology called Time-of-Flight ("ToF") LiDAR. More recently, FMCW LiDAR provides an upgrade to the ToF vision system and is advantageous due to the coherency in detecting the return signal. There is a demand to make the FMCW LiDAR system scalable and easily integrated in compact and demanding environments, such as an autonomous vehicle.

SUMMARY

Embodiments of the invention include a FMCW LiDAR system that may be scalable and easily integrated in compact and demanding environments, for example in autonomous vehicles. The improved FMCW LiDAR system of the present disclosure may include an electro-optic modulator configured to modulate a laser generated by a laser source; a balanced photo detector configured to process an interference signal of a local copy of the laser coupled with a signal of the laser returned from a target and output a beatnote signal; a modulation source with two outputs, wherein the modulation source is configured to sweep in phase across a required bandwidth for the electro-optic modulator and the balanced photo detector; and a Frequency Information Rapid Extraction for Ranging Applications ("FIRE-RA") system configured to: receive the interference signal from the balanced photo detector, process the interference signal with a signal from one of the two outputs of the modulation source for the balanced photo detector, and output distance and speed data for the target according to the processed interference signal.

The FIRE-RA system may provide simpler to develop and more cost-effective solution to the traditional frequency domain DSP systems available on modern FMCW LiDAR products. It may pave the way to truly scalable lower power vision solution that can still simultaneously extract radial velocity and distance information, without the overhead of common complex high-power FPGA chips.

These embodiments and others described herein are improvements in the fields of LiDAR and, in particular, in the area of FMCW LiDAR. The various configurations of these devices are described by way of the embodiments which are only examples and are not intended to limit, but to provide further explanation of the invention as claimed. Other systems, devices, methods, features and advantages of the subject matter described herein will be apparent to one with skill in the art upon examination of the following figures and detailed description. It is intended that all such additional systems, devices, methods, features and advantages be included within this description, be within the scope of the subject matter described herein and be protected by the accompanying claims. In no way should the features of the example embodiments be construed as limiting the appended claims, absent express recitation of those features in the claims.

DETAILED DESCRIPTION

Figure 1:
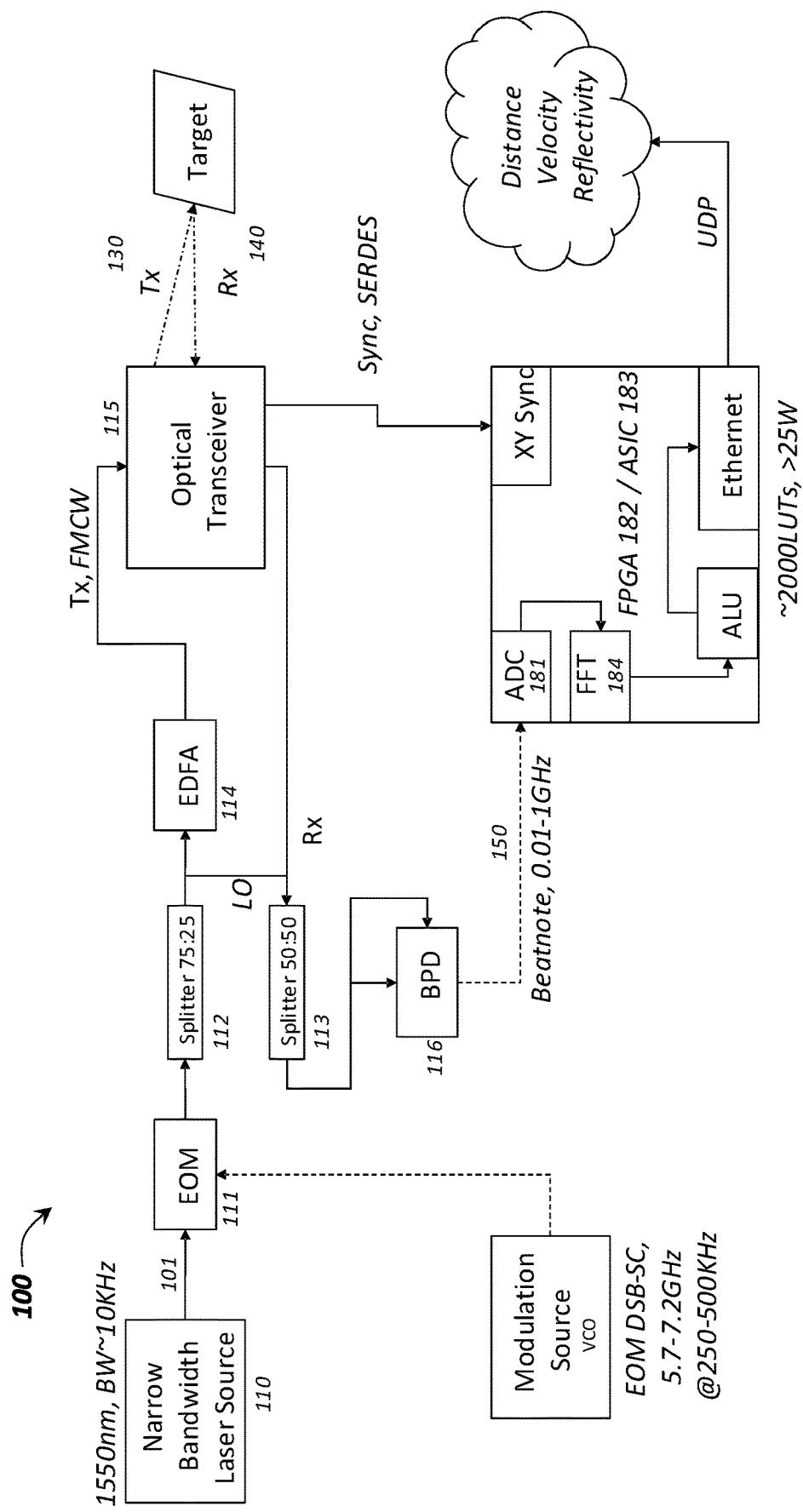
FIG. 1 illustrates a schematic of an exemplary FMCW LiDAR system, according to some embodiments of the present disclosure.

The following disclosure describes various embodiments of the present invention and method of use in at least one of its preferred, best mode embodiment, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

The ToF LiDAR had many disadvantages. For example, the received signal can include noises due to daytime glare. There can be interferences among multiple systems in the same vicinity. The detection range can be limited. The FMCW LiDAR systems can provide an upgrade to the ToF vision system. The FMCW LiDAR systems can provide several advantages. For example, the FMCW LiDAR systems can provide coherent methods in detecting the return signal. In an FMCW LiDAR system, the return light can be interfered with a local copy of the initial signal making the detection well shielded against outside noise that is not coherent with the local copy.

The coherent interferometric nature of the FMCW LiDAR systems is that the dynamic range can be significantly larger due to the detected signal being proportional to the electromagnetic ("EM") field itself, rather than the intensity ($EM_{field}^2$) of the sampling light. Additionally, the FMCW LiDAR systems may be able to observe the Doppler shift information from a target, which can measure the speed/velocity instantaneously versus a ToF systems that uses complex AI operations to estimate this during a sequence of frames. An exemplary FMCW LiDAR system is described in PCT Patent Application No. PCT/US2018/059033, which is incorporated herein in its entirety.

FIG. 1 illustrates a schematic of an exemplary FMCW LiDAR system, according to some embodiments of the present disclosure. As shown in FIG. 1, FMCW system 100 may include a narrow bandwidth laser source (e.g., diode) 110 that is modulated. Narrow bandwidth laser source 110 can generate a laser 101, and a portion 130 of the laser is sent out to a target, while the rest is kept as a local copy and later interfered with a return signal 140 from the target. In some embodiments, the portion 130 of the laser is split from splitter 112. In some embodiments, splitter 112 is a 75:25 splitter. In some embodiments, the laser is further processed through an electro-optic modulator ("EOM") 111, an erbium-doped fiber amplifier ("EDFA") 114, and an optical transceiver 115 as shown in FIG. 1. In some embodiments, EOM 111 is configured to modulate laser 101 from narrow bandwidth laser source 110.

The resulting interference signal can be referred to as a beatnote (or sometimes as beat) 150 and can be recorded by a balanced photodetector ("BPD") 116 in order to reject any common mode noise and further improve the accuracy of the system. In some embodiments, BPD 116 can process an interference signal of the local copy of the laser coupled with return signal 140.

In some embodiments, telecommunication grade components may be readily available and suitable to use because of their high reliability and relative availability. Moreover, telecommunication grade components are generally considered eye-safe, since their operation is usually limited in the 1550 nm light spectrum. The light can be used as a carrier frequency, on which a much lower modulation frequency can be inscribed. The modulation frequency is easier to sample than the hundreds of terahertz ("THz") frequency corresponding to the carrier at 1550 nm wavelength. A typical range of modulation frequency, to cover about 2-200 meters of ranging distance, would have a bandwidth of 500-700 MHz at around 6 GHz of modulation frequency, with each modulation frequency corresponding to a specific radial distance away from the LiDAR source.

However, one of the main struggles of an FMCW LiDAR system is the number of points it can process, due to the entire spectrum of modulated frequencies needing to be sampled, sometimes at rates of 500 KHz or more. For example, as shown in FIG. 1, even though BPD 116 can sample the modulation frequencies at once, the digital signal processing ("DSP") system may not be trivial to make and usually involves at least one high-speed (e.g., greater than 1 GHz) analog-to-digital converter ("ADC") 181 and a field-programmable gate array ("FPGA") 182 with more than 2000 look-up tables ("LUTs") in order to take a fast Fourier transform ("FFT") of the interfered signal and extract the necessary information. For example, as shown in FIG. 1, a specialized unit FFT 184 can be implemented on FPGA 182 to take the FFT of the interfered signal, after the signal has been processed by ADC 181. Moreover, scalability becomes an issue due to custom chip design being required every time a parameter on the modulation frequency is changed, usually involving application-specific integrated circuit ("ASIC") designs or other overkill solutions.

In addition, these complex FPGAs (e.g., FPGA 182 of FIG. 1) can have high thermal loads and consume power in the several tens to hundred Watts, which makes it impractical for integration in various applications (e.g., in autonomous vehicles).

There is a need for an FMCW signal processing system that is scalable and easily integrated in compact and demanding environments such as autonomous vehicles and provides other advantages as described herein.

Figure 2:
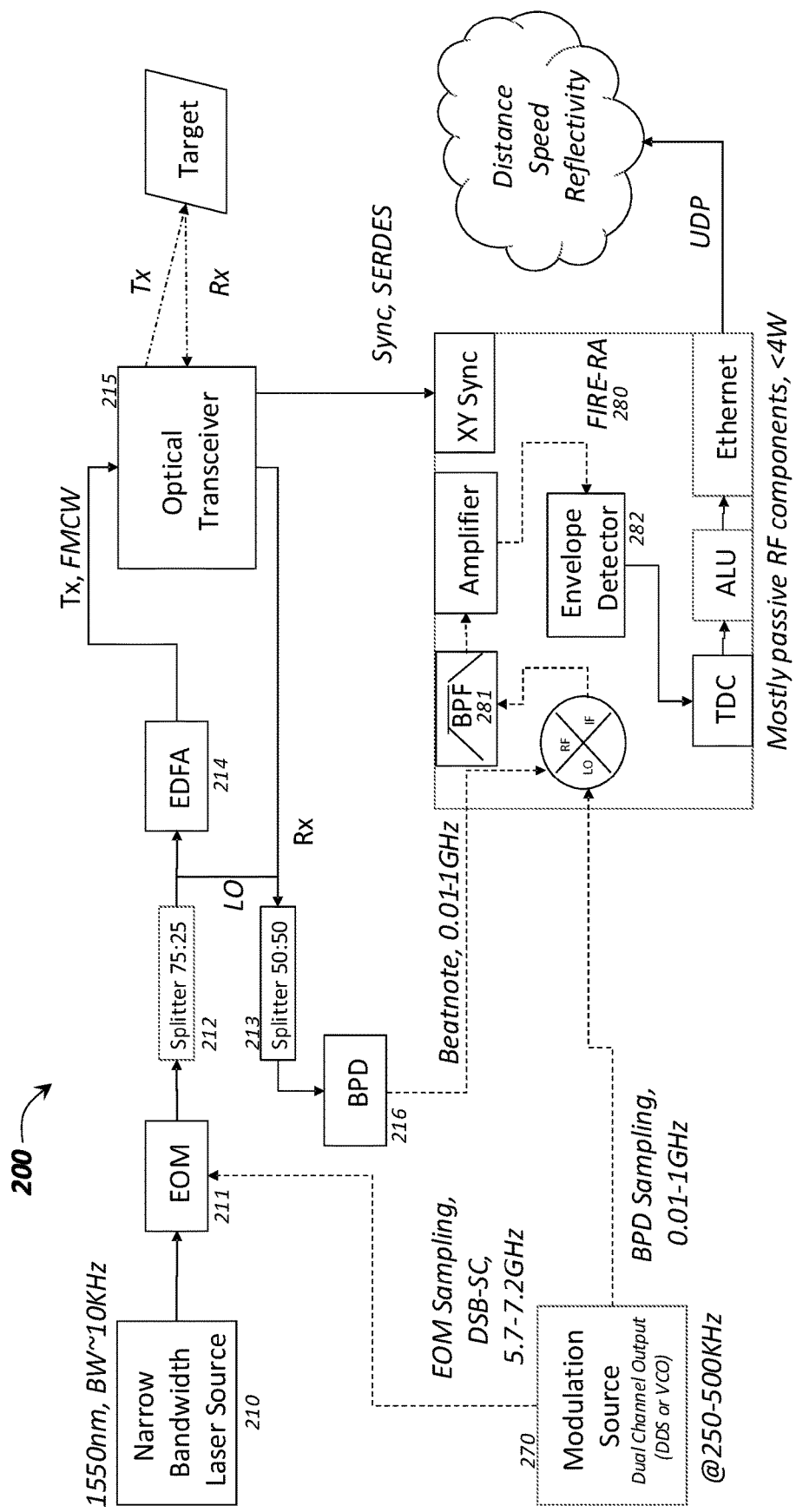
FIG. 2 illustrates a schematic of an exemplary high-level schematic of a FMCW LiDAR system with a Frequency Information Rapid Extraction for Ranging Applications, according to some embodiments of the present disclosure.

Embodiments of the present disclosure provide methods and systems to resolve the issues described above. FIG. 2 illustrates a schematic of an exemplary high-level schematic of a FMCW LiDAR system with a Frequency Information Rapid Extraction for Ranging Applications, according to some embodiments of the present disclosure. As shown in FIG. 2, FMCW LiDAR system 200 may be scalable and easily integrated in compact and demanding environments. It is appreciated that some components of FMCW LiDAR system 200 is similar to those described in FIG. 1. For example, narrow bandwidth laser source 210, EOM 211, splitter 212, splitter 213, EDFA 214, and optical transceiver 215 can be similar to narrow bandwidth laser source 110, EOM 111, splitter 112, splitter 113, EDFA 114, and optical transceiver 115 shown in FIG. 1, respectively.

FMCW LiDAR system 200 may include a Frequency Information Rapid Extraction for Ranging Applications ("FIRE-RA") 280 sampling and processing solution that may allow FMCW LiDAR system 200 to become scalable and easily integrated in compact and demanding environments (e.g., autonomous vehicles). In some embodiments, exemplary benefits of this solution may include the following. First, scalar conversion from frequency to time domain can be achieved, and the need for FFTs can be avoided. Second, FMCW LiDAR system may allow using inexpensive commercial off-the-shelf components ("COTS"). Third, 100 ps temporal resolution via a time-to-digital converter ("TDC") which corresponds to about 2 cm radial distance resolution can be allowed. Fourth, modular design can be used to reduce or eliminate the need for ASIC development (e.g., ASIC 183 or FPGA 182 shown in FIG. 1). Fifth, FMCW LiDAR system 200 can use lower power consumption compared to a traditional FMCW DSP system. For example, FMCW LiDAR system 200 can use approximately 2 W in power, which can be 7 times lower than a traditional FMCW DSP system.

In some embodiments, FMCW LiDAR system 200 can include a modulation source 270 with two outputs. The outputs from modulation source 270 can sweep in phase across the required bandwidth for EOM 211 and the BPD 216 shown in FIG. 2. In some embodiments, this can be achieved with a direct digital synthesizer ("DDS"), or a splitter after a high power (e.g., 10 W RF) voltage-controlled oscillator ("VCO"), where the high-power channel drives the EOM and the splitter drives the sampling for the BPD. In some embodiments, the DDS and the VCO can be a part of modulation source 270 shown in FIG. 2. The advantage of the VCO setup is that off-the-shelf RF parts may be used and troubleshooting can be made easy as the system may not require implementing a control of the output wave form such as when a DDS is used. For high-volume implementations, the DDS method may be preferred as it may provide major manufacturing advantages.

In some embodiments, a FIRE-RA system may treat the output of a BPD as a fixed RF frequency during the duration of one chirp cycle (e.g., 500 KHz repetition rate), where modulation source 270 can ramp up the EOM modulation from around 5.7 GHz to around 7.2 GHz. In some embodiments, modulation source 270 can be chosen for the optimal performance of the available COTS VCO. The BPD sampling channel can then be swept in sync with the EOM and mixed in an radio frequency ("RF") mixer in order to extract the frequency difference at which the BPD beatnote and the swept local oscillator ("LO") port on the mixer coincide. In some embodiments, the RF mixer can have a working range of approximately 0 to 1.5 GHz. One of the benefits over traditional high-speed ADC system is that the sampling occurs in an analog manner in the mixer rather than having to sample the entire output spectrum of the BPD with over >1 GS/s resolution. The FIRE-RA system's RF mixer simply detects when the beatnote occurs and registers the waveform without having to keep track of the information for the rest of the spectrum from the BPD. In some embodiments, if there are multiple frequencies on the BPD, multiple down-converted signals can be present at the output of the mixer. These can be interpreted in later stages to extract radial Distance and Speed or velocity in case of the IQ Demodulation implementation of the FIRE-RA system.

In general, the FIRE-RA system can keep track of "when the beatnote occurs" and how many mixed frequencies between the modulation source bandwidth and the "fixed value" beatnote occurring. This can eliminate the need of the use of FFTs, hence significantly reduces the computational power needed on the FPGA to calculate the radial Distance and Speed values. In some embodiments, a FIRE-RA system may detect with 5 cm total Distance accuracy or better over the range of 300 m away from the optical transceiver and extract at the same time the radial Speed with a 0-156 mph range. This corresponds to two objects moving at 78 mph against each other, while keeping the thermal load under 2 W due to the lack of requirements on the FFTs and the high-speed ADC.

In some embodiments, in order to "locate" when the mixed frequency occurs in time, a band-pass filter ("BPF") 281 can be applied at the output of the RF mixer in FIG. 2. This can cut out a window around the frequency of when the beatnote happens and allows for an envelope detector 282 to register the occurrence. For example, each time the envelope detector "sees" a modulation away from 0, it can track the outline of the packet and outputs a pulse shape as a function of time. The advantage to such scheme is that there may not be a requirement know the actual shape of the beatnote, rather than tracking only "when it occurs". In some embodiments, through logic gates, the FIRE-RA system can extract a digital signal as a function of time that looks like a square wave with a center at the peak of the beatnote occurrence time. In some embodiments, the information about the Doppler shift (or radial Speed magnitude) can be preserved but the number of detected events and their location in time over the period of one chirp (e.g., 2 μs). In some embodiments, band-pass filter 281 can be a band reject filter.

In some embodiments, a FIRE-RA system may include a TDC that can determine the occurrence of the beatnote in time with an accuracy of 100 ps, while the needed resolution in time to achieve 5 cm accuracy is 300 ps. In this sense the FIRE-RA system has a significant margin to spare before it runs up against the limit of what the simple TDC can offer. In some embodiments, the TDC uses an FPGA with a power of <1 W.

In some embodiments, a FIRE-RA system may output the TDC radial Distance and Speed data coupled with an X and Y position information coming from optical transceiver 215 shown in FIG. 2 over an optimized SERDES cable (which saves space in control wires) and output it via an Ethernet cable using a User Datagram Protocol ("UDP") structure to a client such as a visualization system ("ROS"), an autonomous vehicle, or self-driving car AI unit. In some embodiments, the Distance and Speed data coupled with the X and Y position information is measured from the target.

Figure 3:
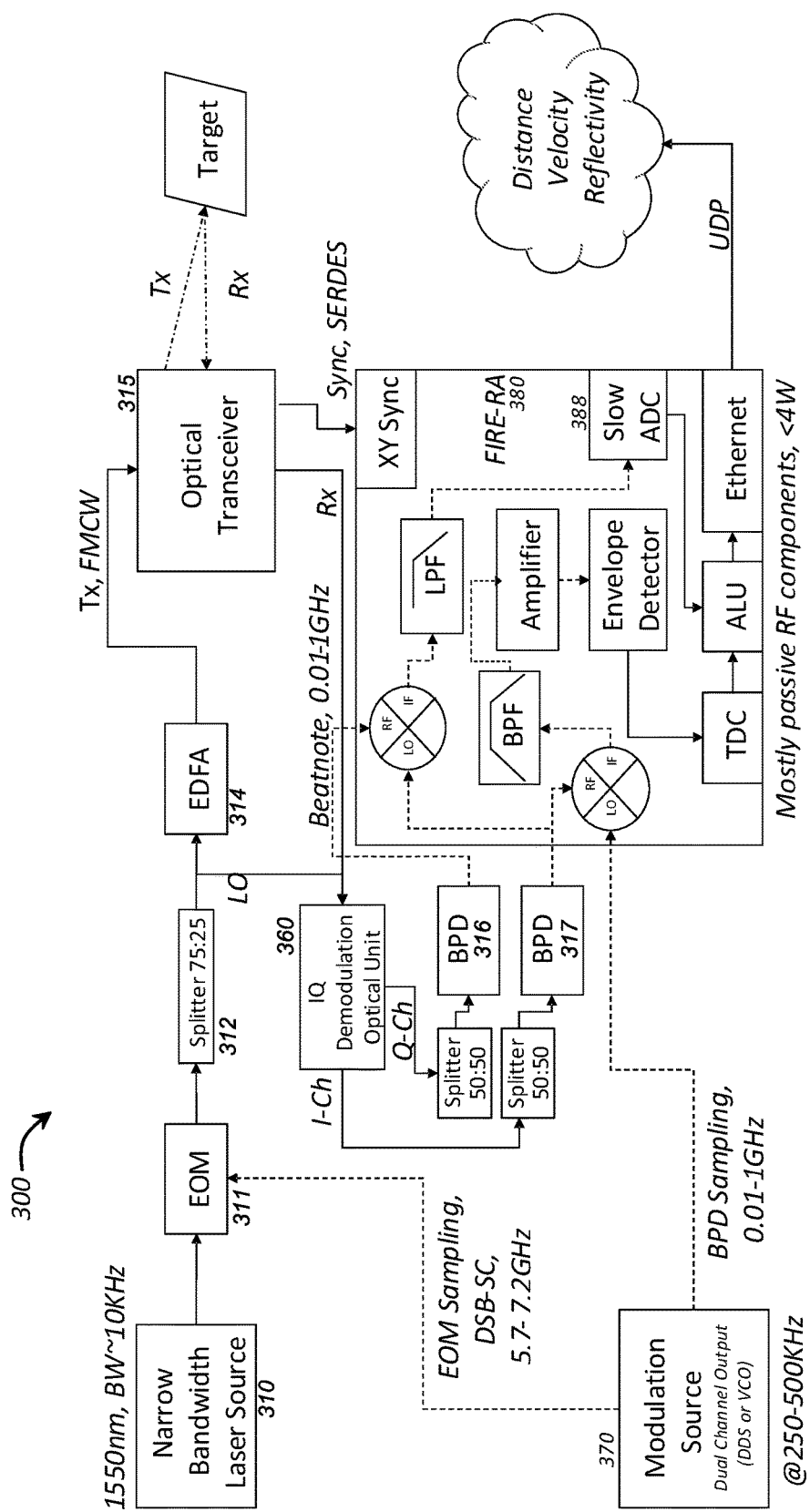
FIG. 3 illustrates a schematic of an exemplary FMCW LiDAR system with IQ demodulation configuration, according to some embodiments of the present disclosure.

FIG. 3 illustrates a schematic of an exemplary FMCW LiDAR system with IQ demodulation configuration, according to some embodiments of the present disclosure. It is appreciated that some components of FMCW LiDAR system 300 shown in FIG. 3 is similar to those described in FIG. 2. For example, narrow bandwidth laser source 310, EOM 311, splitter 312, EDFA 314, and optical transceiver 315 can be similar to narrow bandwidth laser source 210, EOM 211, splitter 212, EDFA 214, and optical transceiver 215 shown in FIG. 2, respectively.

As shown in FIG. 3, FMCW LiDAR system 300 may use an IQ demodulation optical unit 360 to keep a relative phase difference between two separate copies (e.g., with 45 degree phase difference, circular polarization) of the optical LO in the system and interfere them separately with the Rx beam to achieve a separation between so called I and Q channels. In some embodiments, the two copies are interfered separately with 50% of the Rx beam. In some embodiments, the direction of the Doppler shift may then be extracted based on the phase shift between the beatnotes in both channels terminated by a BPD each. In some embodiments, the I channel implores a standard FIRE-RA detection scheme, while a copy of it is mixed against the Q channel to extract the phase difference between the two, which ultimately yields to the direction of the Velocity vector. One of the benefits of using the mixer between the two channels is that a slow ADC 388 can then extract the phase difference, optimizing cost and thermal load of the system. The "positive" or "negative" value is then assigned to the UDP packet above.

Figure 4:
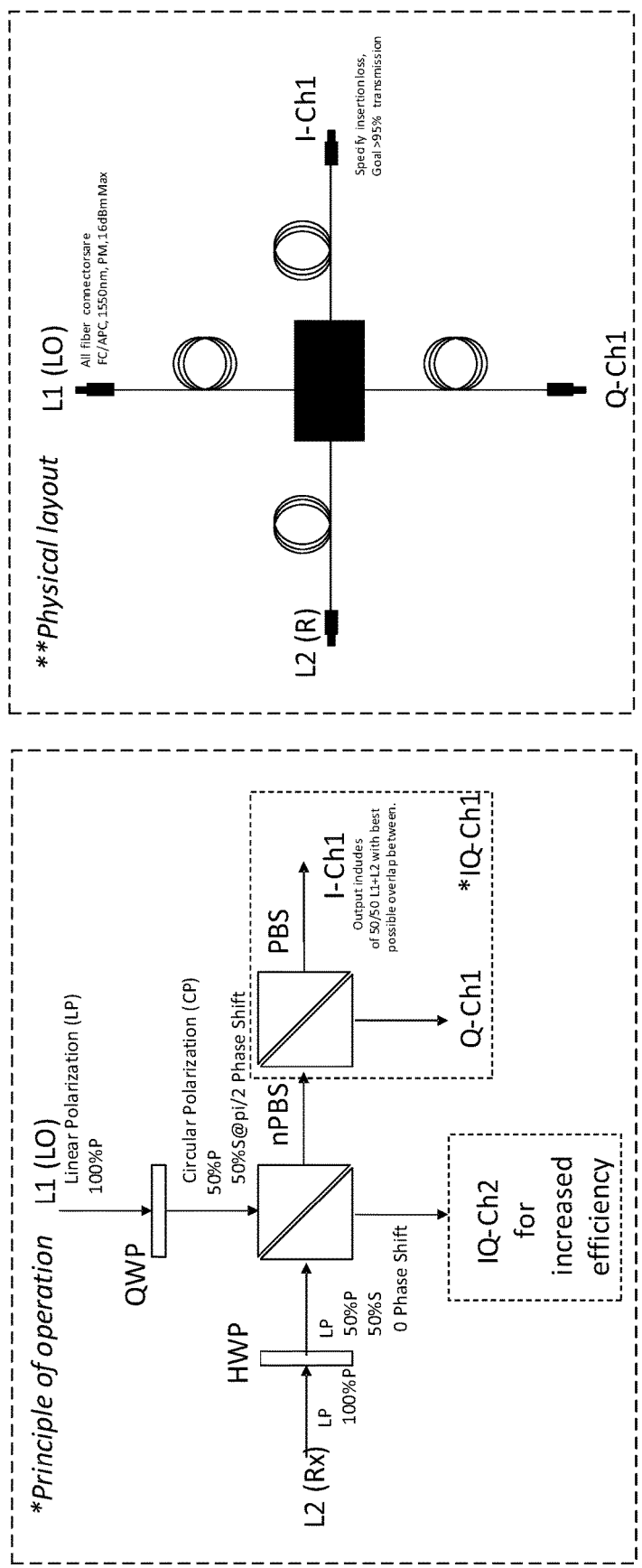
FIG. 4 illustrates a schematic of an exemplary IQ demodulation optical unit configuration, according to some embodiments of the present disclosure.

FIG. 4 illustrates a schematic of an exemplary IQ demodulation optical unit configuration, according to some embodiments of the present disclosure. It is appreciated that the IQ demodulation optical unit configuration shown in FIG. 4 can be incorporated into FMCW LiDAR system 300 shown in FIG. 3 (e.g., as IQ demodulation optical unit 360). As shown in FIG. 4, the IQ demodulation optical unit configuration may allow for distinguishing the sign of the radial velocity vector. For example, the sign of the radial velocity factor can be distinguished by tracking the phase difference of the I and Q channels. The unit's purpose is to physically generate the beatnote between the LO and the received Rx beam and separate the output as projections on two orthogonal polarization axes.

In some embodiments, similar to FIG. 2, the LO oscillator in FIG. 4 may be mixed with the Rx beam. However, the LO may be converted to a circular polarization in free space (e.g., via means of a quarter-wave plate). This may establish a reference for the system. In some embodiments, the Rx beam may also be separated into equal projections over the orthogonal polarization axes, but rather than having a delay between them, it may simply be rotated by means of a half-wave plate. The circular LO and the linear but rotated in polarization Rx beam may interfere at a non-polarizing beam splitter and may then be split into the separate components via polarizing beam splitter. In some embodiments, there may be a 50% loss in signal, which can be further improved via adding another set of polarization splitting channel. In some embodiments, the 50% loss may be acceptable for generating a reliable beatnote signal.

In some embodiments, the generated beatnote may then be constantly rotating one direction or another depending on the sign of the Doppler shift on the Rx beam. The two channels, I and Q, can be electronically tracked. For example, the two channels can be tracked via a simple mixer that takes a copy of the output of the two PBDs and extracts the phase relationship sign. In some embodiments, the phase relationship sign may then be fed into an ADC, as shown in FIG. 3.

Figure 5:
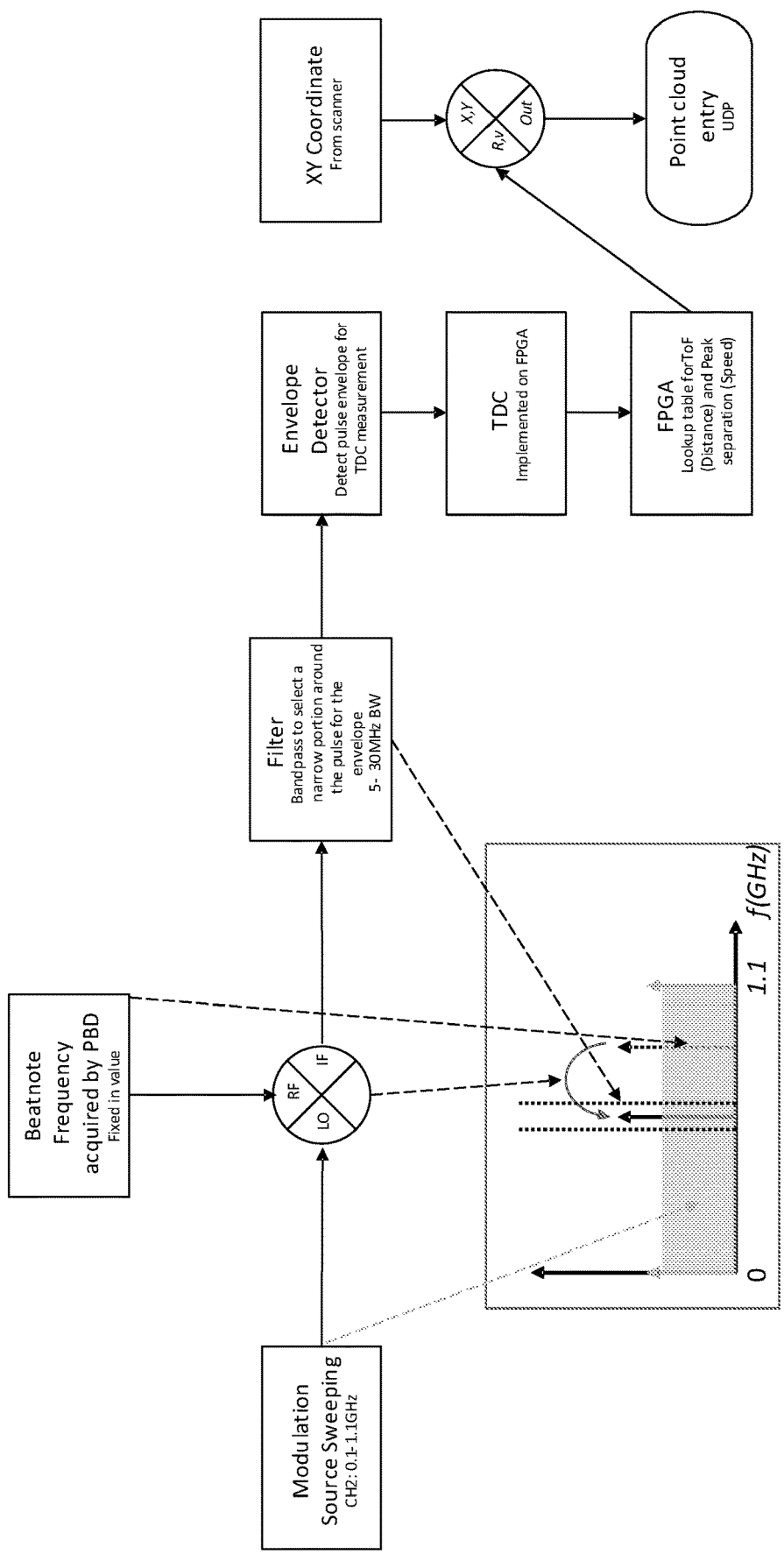
FIG. 5 illustrates a schematic of an exemplary high-level FIRE-RA beatnote detection configuration, according to some embodiments of the present disclosure.

FIG. 5 illustrates a schematic of an exemplary high-level FIRE-RA beatnote detection configuration, according to some embodiments of the present disclosure. It is appreciated that the beatnote detection configuration shown in FIG. 5 can be incorporated into FMCW LiDAR system 300 shown in FIG. 3. As shown in FIG. 5, the FIRE-RA beatnote detection configuration may allow for real-time, non-FFT FMCW LiDAR signal processing. It is appreciated that some elements in FIG. 5 are simplified, and more detailed steps may be presented in FIG. 2, FIG. 3, or FIG. 4. As shown in FIG. 5, the optical beatnote frequency may be treated as fixed after the moment of occurrence, while a modulation sweeping source may be constantly sweeping across the bandwidth of the BPD. The mixer may down-convert the beatnote and a bandpass filter may isolate a portion of the oscillations that is within the range of interest for the envelope detector. The envelope may then be binned and sampled (e.g., via means of a TDC), converted from time to distance and velocity information (e.g., based on the number of peaks detected in one chirp ramp) and may be coupled with X and Y position information that results in a point cloud. The point cloud may be sent over UDP to a visualization device such as laptop but could be directly fed into an AI (e.g., AI in an autonomous vehicle) for further analysis.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

As used herein, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

What is claimed is:

1. A frequency modulated continuous wave ("FMCW") LiDAR system, comprising:
    an electro-optic modulator configured to modulate a laser;
    an in-phase quadrature (IQ) demodulation optical unit configured to generate a beatnote signal between an oscillator signal and a received beam signal, wherein the IQ demodulation optical unit is configured to distinguish a sign of a radial velocity vector obtained from the beatnote signal, wherein the IQ demodulation optical unit, upon separating the beatnote signal into a first signal projection projected onto an in-phase channel and a second signal projection projected onto a quadrature channel, tracks a phase difference between the first signal projection and the second signal projection, wherein the first signal projection and the second signal projection correspond to beatnote signal outputs;
    one or more balanced photo detectors configured to record the beatnote signal outputs;
    a modulation source comprising two outputs; and
    a processing system configured to:
        receive the beatnote signal outputs from the one or more balanced photo detectors,
        process the beatnote signal outputs with a signal from one of the two outputs of the modulation source, and
        output distance and speed data, wherein the speed data comprises the radial velocity vector, for the target according to the processed beatnote signal.

2. The FMCW LiDAR system of claim 1, wherein the in-phase channel is connected to a first splitter and a first balanced photo detector.

3. The FMCW LiDAR system of claim 1, wherein an output of the in-phase channel is connected to an input of a first splitter, and an output of the first splitter is connected to an input of a first balanced photo detector.

4. The FMCW LiDAR system of claim 3, wherein an output of the first balanced photo detector is connected to an input of the processing system.

5. The FMCW LiDAR system of claim 1, wherein the quadrature channel is connected to a second splitter and a second balanced photo detector.

6. The FMCW LiDAR system of claim 1, wherein an output of the quadrature channel is connected to an input of a second splitter, and an output of the second splitter is connected to an input of a second balanced photo detector.

7. The FMCW LiDAR system of claim 6, wherein an input of the second balanced photo detector is connected to an input of the processing system.

8. The FMCW LiDAR system of claim 1, wherein the processing system further comprises:
    a band-pass filter or a band reject filter configured to cut out a window around a frequency of when a beatnote occurs on the beatnote signal, and
    an envelope detector communicatively coupled with the band-pass filter or the band reject filter, wherein the envelope detector is configured to register an occurrence of when the beatnote occurs on the beatnote signal.

9. The FMCW LiDAR system of claim 8, wherein the processing system further comprises:
    an envelope detector communicatively coupled with the band-pass filter or the band reject filter, wherein the envelope detector is configured to register an occurrence of when the beatnote occurs on the beatnote signal.

10. A method comprising:
    modulating, by an electro-optic modulator, a laser;
    generating, by an in-phase quadrature (IQ) demodulation optical unit, a beatnote signal between an oscillator signal and a received beam signal;
    separating, by the IQ demodulation optical unit, the beatnote signal into a first signal projection projected onto an in-phase channel and a second signal projection projected onto a quadrature channel;
    tracking, by the IQ demodulation optical unit, a phase difference between the first signal projection and the second signal projection, wherein the first signal projection and the second signal projection correspond to beatnote signal outputs;
    distinguishing, by the IQ demodulation optical unit, a sign of a radial velocity vector obtained from the beatnote signal outputs;
    recording, by one or more balanced photo detectors, the beatnote signal outputs;
    receiving, by a processing system, from the one or more balanced photo detectors, the beatnote signal outputs;
    processing, by the processing system, the beatnote signal outputs with a signal from one of the two outputs received from a modulation source; and
    outputting, by the processing system, distance and speed data, wherein the speed data comprises the radial velocity vector, for the target according to the processed beatnote signal.

11. A frequency modulated continuous wave ("FMCW") LiDAR system, comprising:
    an electro-optic modulator configured to modulate a laser;
    an in-phase quadrature (IQ) demodulation optical unit configured to generate a beatnote signal between an oscillator signal and a received beam signal, wherein the IQ demodulation optical unit is configured to distinguish a sign of a radial velocity vector obtained from the beatnote signal;
    a balanced photo detectors configured to record the beatnote signal;
    a modulation source comprising two outputs; and
    a processing system comprising band-pass filter or a band reject filter and an envelope detector, wherein the processing system is configured to:
        receive the beatnote signal from the balanced photo detector,
        process the beatnote signal with a signal from one of the two outputs of the modulation source,
        using the band-pass filter or the band-reject filter, cut out a window around a frequency of when a beatnote occurs on the beatnote signal,
        using the envelope detector, register an occurrence of when the beatnote occurs on the beatnote signal, and output distance and speed data, wherein the speed data comprises the radial velocity vector, for the target according to the processed beatnote signal.

\* \* \* \* \*